July 6, 1954  H. E. SCHORNSTEIN  2,682,777
LAMINATED DRIVING BELT
Filed March 8, 1951
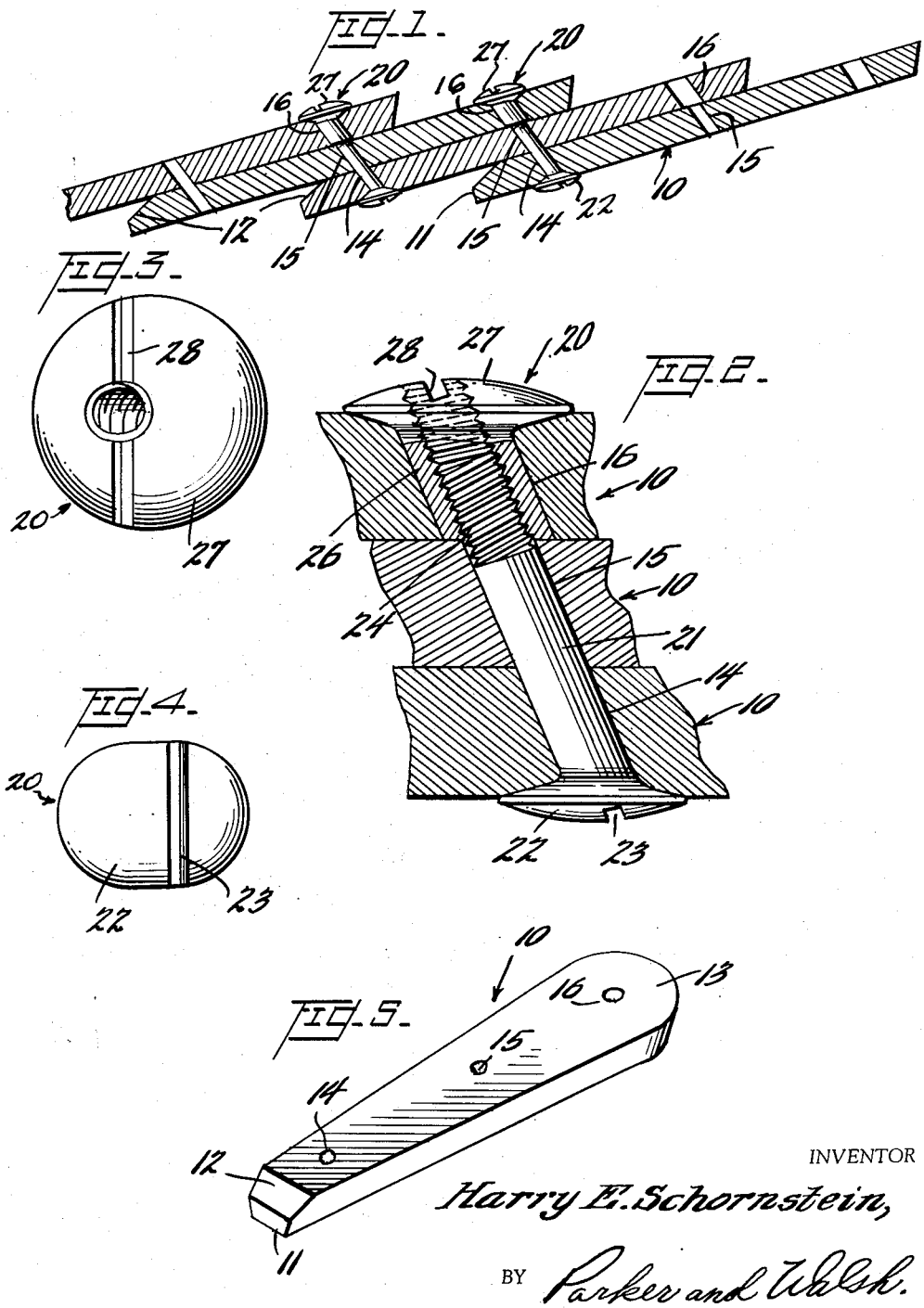
INVENTOR
Harry E. Schornstein,
BY Parker and Walsh.
ATTORNEYS

Patented July 6, 1954

2,682,777

UNITED STATES PATENT OFFICE 2,682,777

LAMINATED DRIVING BELT

Harry E. Schornstein, Indianapolis, Ind.

Application March 8, 1951, Serial No. 214,558

3 Claims. (Cl. 74—235)

This invention relates to a laminated driving belt of the type formed of a number of overlapping links formed of suitable flexible material such as leather, rubber-impregnated fabric, etc.

Laminated driving belts of the type referred to have been in use for a number of years because of certain advantages which they possess, such as flexibility, etc., but are open to a number of objections. The overlapping elements or links which go to make up the belt taper to increase in width from the inner toward the outer ends and are tapered to decrease in width inwardly, thus presenting a belt of V-shape to fit conventional V pulleys. It is the usual practice to connect the laminations together by fastening elements, one of which is fixed to the narrower end of each lamination by being riveted thereto. Each such element has a shank extending upwardly from the lamination to which it is connected and is provided with a head which must be worked up through slots and slits in the overlying laminations in order to assume their operative positions. These slots and slits obviously weaken the laminations and make it extremely difficult to assemble the belt, and accordingly, the means previously used for making and assembling the belts is relatively expensive and the belts lack tensile strength necessary for transmitting heavy or pulsating loads.

Due to the clearance between the links and fastening elements, such elements tend to lean back at their outer ends when the belt is under tension and the heads of the fastening elements dig into the top of the adjacent outer link surface, thus shortening the life of the belt. Because of the degree of stretch in the belt, it usually is measured short of its operative length and stretched into place over the pulleys. Even so, if shock loads or other unusual conditions exist, the belt stretches further and must be shortened several times after installation.

Each new user of belts of this type now available must be individually educated as to the proper method of coupling and installing the laminations. Particularly in the case of belts of larger sizes with thicker links and more laminations, it is very difficult even for trained factory personnel, equipped with special tools and using correct procedural techniques, to couple and uncouple the belt.

It would appear desirable to enlarge the outer heads of the fastening elements of the laminations to provide a broader surface to minimize the digging of the head into the outer surface of each belt lamination. With prior constructions, this has been impracticable. Because of the necessity for assembling the laminations by forcing the outer ends of the shanks through slots, the use of larger heads is substantially impossible.

An important object of the present invention is to provide a novel belt structure of the character referred to wherein the assembling of the elements is greatly facilitated and the time and costs of the various operations are greatly reduced.

A further object is to increase the tensile strength and reduce the stretch in laminated V-belting.

A further object is to provide such a structure wherein it is unnecessary to rivet each fastening element to the narrower end of each lamination, thus eliminating the consequent riveting operation.

A further object is to eliminate the necessity for cutting slots and slits for the insertion of the heads of the fastening elements, thus eliminating the cost of cutting such slots and slits and eliminating the weakening of the laminations resulting therefrom.

A further object is to provide such an assembly of elements in a structure of this character that the head of each shank may be very much enlarged and wherein the arrangement of parts is such as to permit the use of fastening elements each formed of screw-threaded separable sections, thus greatly facilitating the assembly of the elements and further reducing the cost of the belt.

A further object is to provide such a construction wherein the heads engageable against opposite sides of the belt are inclined at an acute angle relative to the axis of the shank portion of each fastener, whereby the heads are prevented from rotating relative to each other when the belt is in operation, thus rendering practicable the use of screw-threaded elements without any chance that the sections of each fastening element will become disengaged from each other in the use of the belt.

Other objects and advantages of the invention will become apparent during the course of the following description.

In the drawing, I have shown one embodiment of the invention. In this showing,

Figure 1 is a longitudinal sectional view through a portion of a laminated belt showing two of the fastening elements in their normal positions therein, Figure 2 is an enlarged fragmentary sectional 7 showing one of the fastening elements in tion, parts being shown in elevation,
igure 3 is a plan view of one type of head for outer member of each fastening element,
igure 4 is a plan view of one of the inner ds, and
'igure 5 is a perspective view of one of the belt inations.

teferring to the drawing, the numeral 10 designates as a whole each of a plurality of belt laminations assembled in overlapping relationship as own in Figure 1 to form the finished belt. ese laminations may be made of any suitable iterial in accordance with present practice. As own in detail in Figure 5, each lamination  own to decrease in width toward its relatively next outer lamination, and then through the opening 16 of the outermost lamination. The sleeve 25 is then threaded on the shank 21 and screw drivers are engaged in the slots 23 and 28. The head 22 is then held against rotation while the head 27 is rotated to move the head 27 inwardly tightly against the outermost lamination. The deformability of the laminations permits the head 27 to be rotated into snug engagement with the outermost lamination. All of the laminations are assembled in the same manner, whereupon the belt is ready for operation.

The primary purpose of the inclination of the heads of each fastening element relative to the shank portion thereof is to provide means for locking each stud head from rotation and keeping it from becoming unscrewed when in use.

to dig into the belt, the final or total stretching of the belt is reduced and the life of the belt accordingly is materially increased.

As stated above, the width of the head 27 transversely of the belt is limited only by the width of the belt. However, the present construction renders it wholly practicable to use a head 27 elongated longitudinally of the belt to increase the bearing area referred to above. The studs and links can be assembled into the finished belt in a single assembly operation since the riveting of the studs to the innermost laminations is eliminated. Moreover, the user can readily uncouple the belt merely by unscrewing the stud fasteners, although these fasteners cannot become unscrewed when the belt is in use for the reasons stated. Where the belt becomes unduly stretched, it will be obvious that it very readily may be shortened by removing the belt, unscrewing two adjacent heads 27, which usually is all that is necessary, removing the surplus lamination, and reconnecting the belt ends. Because of the simplicity of these operations, the belt may be shortened very quickly without any particular degree of skill.

I claim:

1. A laminated belt comprising a plurality of flexible relatively deformable links arranged in overlapping relationship, each set of overlapping links having aligned openings therethrough inclined in one direction with respect to a line perpendicular to the faces of the links, and a fastening device passing through each set of aligned openings, each fastening device comprising separable shank portions, one of said portions having a head engaging the inner face of the innermost link and the other portion having a head engaging the outer face of the outermost link element, each head being inclined from a plane perpendicular to the axis of said shank portions approximately to the same extent that said openings are inclined relative to a line perpendicular to the faces of said links whereby said heads are adapted to lie substantially flat against the adjacent faces of the links.

2. A laminated belt comprising a plurality of flexible relatively deformable links arranged in overlapping relationship, each set of overlapping links having aligned openings therethrough inclined in one direction with respect to a line perpendicular to the faces of the links, and a fastening device passing through each set of aligned openings, each fastening device comprising a pair of shank portions one of which is axially threaded into the other, one shank portion having a head of substantial area engaging the inner face of the innermost link and the other shank portion having a head of substantial area engaging the outer face of the outermost link, each head being inclined from a plane perpendicular to said shank portions to an extent approximately equal to the inclination of each set of openings from a line perpendicular to the faces of said links whereby each head is adapted to lie substantially flush against the adjacent link face when said shank portions are tightly threaded together, each head having a screw driver recess for relative rotation of said shank portions.

3. A laminated belt comprising a plurality of links arranged in overlapping relationship, and fastening devices passing through adjacent links to secure them together, each fastening device comprising a pair of elements each having a shank portion one of which is axially threaded into the other, one of said elements having a head engaging the inner face of the innermost link through which it passes and the other element having a head engaging the outer surface of the outermost link through which it passes, each head being inclined relative to a plane perpendicular to the axis of said shank portions whereby any tendency for either head to rotate will result in its binding against the adjacent link face, said links being formed of deformable material whereby said shank portions will be inclined in one direction with respect to a line perpendicular to the faces of said links when under tension, and said heads will lie substantially flat against the adjacent faces of the links.

References Cited in the file of this patent

UNITED STATES PATENTS

| Number | Name | Date |
| --- | --- | --- |
| 363,074 | Lockwood | May 17, 1887 |
| 1,824,900 | Kaufman | Sept. 29, 1931 |
| 2,249,726 | Brammer | July 22, 1941 |
| 2,455,400 | Brammer | Dec. 7, 1948 |

FOREIGN PATENTS

| Number | Country | Date |
| --- | --- | --- |
| 522,259 | Great Britain | June 13, 1940 |
| 534,142 | Great Britain | Feb. 28, 1941 |